(12) United States Patent
Wang (10) Patent No.: US 11,077,909 B2
(45) Date of Patent: Aug. 3, 2021

(54) SELF-BALANCING SCOOTER

(71) Applicant: Zhejiang Raymond Way Electronic Technology Co., LTD., Wuyi (CN)

(72) Inventor: Junjie Wang, Yongkang (CN)

(73) Assignee: ZHEJIANG RAYMOND WAY ELECTRONIC TECHNOLOGY CO., LTD., Wuyi (CN)

( * ) Notice: Subject to any disclaimer, the term of this patent is extended or adjusted under 35 U.S.C. 154(b) by 267 days.

(21) Appl. No.: 16/404,727

(22) Filed: May 6, 2019

(65) Prior Publication Data
US 2020/0354008 A1 Nov. 12, 2020

(51) Int. Cl.
  *B62K 11/00* (2006.01)
  *B62K 15/00* (2006.01)
  *B62K 3/00* (2006.01)

(52) U.S. Cl.
  CPC .......... *B62K 11/007* (2016.11); *B62K 3/002* (2013.01); *B62K 15/006* (2013.01); *B62K 2204/00* (2013.01)

(58) Field of Classification Search
  None
  See application file for complete search history.

(56) References Cited

U.S. PATENT DOCUMENTS 9,045,190 B2 * 6/2015 Chen .................... A63C 17/014

FOREIGN PATENT DOCUMENTS

| CN | 106218776 B | * | 4/2019 | .......... B62K 11/007 |
| CN | 109677548 A | * | 4/2019 | |

* cited by examiner

*Primary Examiner* — Kevin Hurley (57) ABSTRACT

A self-balancing scooter includes a first holder configured with a first foot pedal, a second holder hinged to the first holder and configured with a second foot pedal, a first wheel frame hinged to the first holder, a second wheel frame hinged to the second holder, two wheels rotationally disposed in the first wheel frame and the second wheel frame, respectively, two driving devices respectively disposed in the first wheel frame and the second wheel frame and configured to drive the wheel to rotate, a power supply disposed the second holder and/or the first holder, a first induction device mounted between the first foot pedal and the first holder, a second induction device mounted between the second foot pedal and the second holder, and a handle disposed at a hinge connection location of the first holder and the second holder.

13 Claims, 6 Drawing Sheets

SELF-BALANCING SCOOTER

TECHNICAL FIELD

The present invention relates to the field of vehicles, and in particular to a self-balancing scooter.

BACKGROUND

As people's awareness of environmental protection has increased, the number of electrical vehicles has increased. At the same time, scientists have finally developed a new two-wheeled self-balancing scooter through painstaking research. The two-wheeled self-balancing scooter is a new type of vehicle. The wheel arrangement of the self-balancing scooter is different from that of the electrical bicycle and the motorcycle, the two wheels of the self-balancing scooter are fixed in a side-by-side may. The self-balancing scooter is supported by two wheels, supplied by a battery power, driven by a motor drive, and controlled by a single-chip, and an attitude sensor collects angular velocity and angle signals of the self-balancing scooter, and the balance of a scooter body is coordinately controlled. Thus, the self-balancing scooter may start, accelerate, decelerate, or stop by changing the gravity centre of the scooter body.

The self-balancing scooter is gradually loved by young people and sports enthusiasts, and gradually mass-produced to appear in people's daily lives. However, the self-balancing scooter also has some defects:

Firstly, the overall weight of the self-balancing scooter is relatively great. The self-balancing scooter is lighter than the electrical vehicle, but its weight is still a burden of the user. The user often needs to lift the self-balancing scooter because the self-balancing scooter cannot adapt to the uneven or stepped ground.

Secondly, it is inconvenient to carry the self-balancing scooter. Some self-balancing scooters are configured with a handle, but the self-balancing scooter can't be folded. When the user carries the self-balancing scooter, the self-balancing scooter is relatively large in size, and it is cumbersome to pick up and put down.

SUMMARY

In order to overcome the deficiencies of the prior art, the disclosure provides a self-balancing scooter.

The objective of the disclosure is achieved by the following technical solutions:

A self-balancing scooter includes a first holder configured with a first foot pedal and a first cover, a second holder hinged to the first holder and configured with a second foot pedal and a second cover, a first wheel frame hinged to the first holder, a second wheel frame hinged to the second holder, two wheels rotationally disposed in the first wheel frame and the second wheel frame, respectively, a power supply disposed the second holder and/or the first holder, and a handle.

A first end of the first holder is hinged to a first end of the second holder, a second end of the first holder is hinged to the first wheel frame, and a second end of the second holder is hinged to the second wheel frame; a hinge connection location of the first holder and the second holder is named as a first hinge connection location, a hinge connection location of the first holder and the first wheel frame is named as a second hinge connection location, and a hinge connection location of the second holder and the second wheel frame is named as a third hinge connection location; the first cover is mounted above the first foot pedal, and the second cover is mounted above the second foot pedal; the first foot pedal is rotatable relative to the first holder, and the second foot pedal is rotatable relative to the second holder.

The handle is disposed at the first hinge connection location; when the handle is lifted up, the first holder and the second holder are folded toward each other, the first wheel frame rotates relative to the second hinge connection location until the first wheel frame abuts the first cover, and the second wheel frame rotates relative to the third hinge connection location until the second wheel frame abuts the second cover; when the handle is released, the first holder and the second holder are in an unfolded state, the first wheel frame returns to be disposed at the second end of the first holder and the second wheel frame returns to be disposed at the second end of the second holder to make the self-balancing scooter be in a riding state.

Preferably, a first connecting rod is disposed between the first holder and the second wheel frame, and a second connecting rod is disposed between the second holder and the first wheel frame; when the self-balancing scooter is in the riding state, the first connecting rod and the second connecting rod are under the first holder and the second holder; when the self-balancing scooter is in the folded state, the first connecting rod and the second connecting rod are in a gap between the first holder and the second holder.

Preferably, a first end of the first connecting rod is hinged to a lower surface of the first holder, a second hinged seat extends laterally from the second wheel frame, and a second end of the first connecting rod is hinged to the second hinged seat; a first end of the second connecting rod is hinged to a lower surface of the second holder, a first hinged seat extends laterally from the first wheel frame, and a second end of the second connecting rod is hinged to the first hinged seat; the first hinged seat and the second hinged seat are located above inner surfaces of the first wheel frame and the second wheel frame.

Preferably, the first hinge connection location is located at a lower end of a contact position of the first holder and the second holder; when the self-balancing scooter is in the riding state, the first end of the first holder and the first end of the second holder abut against each other.

Preferably, the second hinge connection location is located at the second end of the first holder, and the third hinge connection location is located at the second end of the second holder; when the self-balancing scooter is in the riding state, a first end of the first wheel frame and the second end of the first holder abut against each other, and a first end of the second wheel frame and the second end of the second holder abut against each other.

Preferably, the second hinge connection location and the third hinge connection location are respectively located above gravity centre of the first wheel frame and the second wheel frame such that when the handle is lifted up, the first wheel frame rotates relative to the second hinge connection location under an influence of gravity until the first wheel frame abuts the first cover, and the second wheel frame rotates relative to the third hinge connection location under the influence of gravity until the second wheel frame abuts the second cover.

Preferably, when the self-balancing scooter is in the riding state, the handle passes out the first holder and/or the second holder, and is partially exposed.

Preferably, a groove is formed between the first holder and the second holder for receiving the handle.

Preferably, the first holder and the second holder are respectively provided with one power supply; the power supply in the first holder supplies power to the driving device in the first wheel frame and the first induction device, and the power supply in the second holder supplies power to the driving device in the second wheel frame and the second induction device.

Preferably, the self-balancing scooter further includes two driving devices respectively disposed in the first wheel frame and the second wheel frame and configured to drive the wheels to rotate, a first induction device mounted between the first foot pedal and the first holder, and a second induction device mounted between the second foot pedal and the second holder; the first induction device is configured to induce movement or movement trend of the first foot pedal and sends a first signal to the driving device in the first wheel frame, and the second induction device is configured to induce movement or movement trend of the second foot pedal and sends a second signal to the driving device in the second wheel frame; the driving device in the first wheel frame starts to work after receiving the first signal, and the driving device in the second wheel frame starts to work after receiving the second signal.

Preferably, the driving device includes a drive motor, an inner side of the wheel is configured with an internal gear, the drive motor is configured with an output gear, and the output gear is meshed with the internal gear.

Preferably, the driving device includes a drive motor, an inner side of the wheel is configured with an internal gear, an output end of the drive motor is configured with a reduction gearbox, an outer side of the reduction gearbox is configured with an output gear, and the output gear is meshed with the internal gear.

Preferably, the first wheel frame includes a first half frame and a second half frame, the first half frame and the second half frame are fixed to each other, and the wheel is limited between the first half frame and the second half frame; the first half frame and the second half frame are hollowed, a plurality of locating bearings are fixed between the first half frame and the second half frame, and an outer edge of the locating bearing abuts against an inner surface of the wheel and supports the wheel; the second wheel frame includes a first half frame and a second half frame, the first half frame and the second half frame are fixed to each other, and the wheel is limited between the first half frame and the second half frame; the first half frame and the second half frame are hollowed, the plurality of locating bearings are fixed between the first half frame and the second half frame, and the outer edge of the locating bearing abuts against the inner surface of the wheel and supports the wheel.

The figure: 1, first holder; 10, first cover; 11, soft rubber sheeting; 12, first foot pedal; 13, first induction device; 14, rotating bracket; 15, power supply; 16, female plug; 17, male plug; 18, groove; 2, second holder; 20, second cover; 21, soft rubber sheeting; 22, second foot pedal; 23, second induction device; 3, handle; 4, first wheel frame; 41, first half frame; 42, second half frame; 45, first hinged seat; 5, second wheel frame; 51, first half frame; 52, second half frame; 55, second hinged seat; 6, wheel; 61, internal gear; 71, second connecting rod; 72, first connecting rod; 8, drive motor; 81, output gear; 9, locating bearing.

DETAILED DESCRIPTION OF THE PREFERRED EMBODIMENTS

Below, embodiments of the disclosure will be described in detail with reference to the drawings. It should be noted that the figures are illustrative rather than limiting. The figures are not drawn to scale, only for illustrating every aspect of the described embodiments, and do not limit the scope of the present disclosure.

As shown in FIGS. 1-7, an embodiment of the disclosure provides a self-balancing scooter including a first holder 1 and a second holder 2 hinged to each other, a first end of the first holder 1 is hinged to a first end of the second holder 2. A first wheel frame 4 is hinged to a second end of the first holder 1, and a second wheel frame 5 is hinged to a second end of the second holder 2. One wheel 6 is rotationally mounted in the first wheel frame 4, and another wheel 6 is rotationally mounted in the second wheel frame 5. The first wheel frame 4 and the second wheel frame 5 are respectively provided with one independent driving device (not shown) for driving the wheel 6 to rotate. A first half part including the first holder 1, the first wheel frame 4, and the wheel 6, and a second half part including the second holder 2, the second wheel frame 5, and the another wheel 6, of the self-balancing scooter are only connected in a hinged manner, and the first half part and the second half part respectively have the ability to work independently, and are combined to form a whole entity, thereby changing the traditional installing and connecting method of the self-balancing scooter, reducing the connection components, and decreasing the weight of the self-balancing scooter.

A first foot pedal 12 is rotationally mounted on the first holder 1, and the first foot pedal 12 may rotate relative to the first holder 1, or the first foot pedal 12 has a rotational trend relative to the first holder 1. A first induction device 13 is mounted between the first foot pedal 12 and the first holder 1. The first induction device 13 is configured to induce movements or movement trends of the first foot pedal 12, and send a first signal to the driving device in the first wheel frame 4, and the driving device starts to work after receiving the first signal. A first cover 10 is mounted to the first holder 1 and is above the foot pedal 12, and a soft rubber sheeting 11 is disposed on the first cover 10.

A second foot pedal 22 is rotationally mounted on the second holder 2, and the second foot pedal 22 may rotate relative to the second holder 2, or the second foot pedal 22 has a rotational trend relative to the second holder 2. A second induction device 23 is mounted between the second foot pedal 22 and the second holder 2. The second induction device 23 is configured to induce movements or movement trends of the second foot pedal 22, and send a second signal to the driving device in the second wheel frame 5, and the driving device starts to work after receiving the second signal. A second cover 20 is mounted to the second holder 2 and is above the foot pedal 22, and a soft rubber sheeting 21 is disposed on the second cover 20.

The first induction device 13 and the second induction device 23 are preferably angular sensor, and the angular sensor is configured to sense the movements or movement trends of the first foot pedal 12 and the second foot pedal 22. The angular sensor is configured to preferably sense a rotation motion, thereby ensuring the accuracy of the first and second signals sent to the driving devices, and improving the stability of the driving device. In the embodiment, the first foot pedal 12 is rotationally disposed in the first holder 1 through a rotating bracket 14 which comprises a base fixed on the first holder 1 and a rotatable shaft fixed to the first foot pedal 12, and the second foot pedal 22 is rotationally disposed in the second holder 2 through the rotating bracket 14, the user directly or indirectly stands on the first foot pedal 12 and the second foot pedal 22 to drive the first foot pedal 12 and the second foot pedal 22 to rotate forwards or backwards. The angular sensor is directly mounted under the first foot pedal 12 and the second foot pedal 22, thereby quickly sensing the user's movement demand.

A power supply 15 is disposed in the first holder 1 and/or the second holder 2. In the embodiment, the first holder 1 and the second holder 2 are respectively provided with one power supply 15. The power supply in the first holder 1 supplies power to the driving device in the first wheel frame 4 and the first induction device 13, and the power supply 15 in the second holder 2 supplies power to the driving device in the second wheel frame 5 and the second induction device 23. In order to expand the function of the self-balancing scooter, a contact position of the first holder 1 and the second holder 2 are respectively set a female plug 16 and a male plug 17 to connect the first half part with the second half part, specially, the female plug 16 is mounted to the first end of the first holder 1 and the male plug 17 is mounted to the first end of the second holder 2. The connection manner of the first half part and the second half part is the development direction of the subsequent products. Therefore, the present disclosure does not specifically expand and describe the content, and the direction of the research and development includes sharing of the power supply 15, sharing of the signal sent to the driving device, and so on.

A hinge connection location of the first holder 1 and the second holder 2 is named as a first hinge connection location, a hinge connection location of the first holder 1 and the first wheel frame 4 is named as a second hinge connection location, and a hinge connection location of the second holder 2 and the second wheel frame 5 is named as a third hinge connection location. A handle 3 is disposed at the first hinge connection location. When the handle 3 is lifted up, the first holder 1 and the second holder 2 are rotated toward each other to cause the scooter to be folded in half, the first wheel frame 4 rotates relative to the second hinge location until the first wheel frame 4 abuts the first cover 10, and the second wheel frame 5 rotates relative to the third hinge location until the second wheel frame 5 abuts the second cover 20. The self-balancing scooter may be folded, thereby greatly reducing the space occupied by the self-balancing scooter. The user may easily carry the self-balancing scooter through the handle 3, when the handle 3 is released, the first holder 1 and the second holder 2 are in unfolded state, the first wheel frame 4 returns to be disposed at the second end of the first holder 1 and the second wheel frame 5 returns to be disposed at the second end of the second holder 2 to make the self-balancing scooter be in a riding state.

A first connecting rod 72 is disposed between the first holder 1 and the second wheel frame 5, and a second connecting rod 71 is disposed between the second holder 2 and the first wheel frame 4. When the self-balancing scooter is in the riding state, the first connecting rod 72 and the second connecting rod 71 are under the first holder 1 and the second holder 2; when the self-balancing scooter is in the folded state, the first connecting rod 72 and the second connecting rod 71 are in a gap between the first holder 1 and the second holder 2. A cross-supported manner of the first connecting rod 72 and the second connecting rod 71 improves the structural stability of the self-balancing scooter in the riding state, and plays a leading role in the folding or unfolding process of the self-balancing scooter to make the self-balancing scooter be easily folded or unfolded.

A first end of the first connecting rod 72 is hinged to a lower surface of the first holder 1, a second hinged seat 55 extends laterally from the second wheel frame 5, and a second end of the first connecting rod 72 is hinged to the second hinged seat 55. A first end of the second connecting rod 71 is hinged to a lower surface of the second holder 2, a first hinged seat 45 extends laterally from the first wheel frame 4, and a second end of the second connecting rod 71 is hinged to the first hinged seat 45. The first hinged seat 45 and the second hinged seat 55 are located above the inner surfaces of the first wheel frame 4 and the second wheel frame 5. Thus, the first hinged seat 45 and the second hinged seat 55 do not affect rotation of the first wheel frame 4 and the second wheel frame 5, thereby ensuring the structural stability of the self-balancing scooter in the riding state.

The first hinge connection location is located at a lower end of the contact position of the first holder 1 and the second holder 2. When the self-balancing scooter is in the riding state, the first end of the first holder 1 and the first end of the second holder 2 abut against each other. The second hinge connection location is located at a second end of the first holder 1, preferably an upper part of the second end of the first holder 1, such that the self-balancing scooter may bear relatively great force. The third hinge connection location is located at a second end of the second holder 2, preferably an upper part of the second end of the second holder 2, such that the self-balancing scooter may bear relatively great force. When the self-balancing scooter is in the riding state, a first end of the first wheel frame 4 and the second end of the first holder 1 abut against each other, and a first end of the second wheel frame 5 and the second end of the second holder 2 abut against each other. Thus, the structural stability of the self-balancing scooter is ensured in the riding state through the above-mentioned hinge manner.

The second hinge connection location and the third hinge connection location are respectively located above the gravity centre of the first wheel frame 4 and the second wheel frame 5. When the handle 3 is lifted up, the first wheel frame 4 rotates relative to the second hinge connection location under an influence of gravity until the first wheel frame 4 is pressed to the first holder 1 to be close to the first surface of the first foot pedal 12, and the second wheel frame 5 rotates relative to the third hinge connection location under the influence of gravity until the second wheel frame 5 is pressed to the second holder 2 to be close to the first surface of the second foot pedal 22. Thus, the speed of folding the self-balancing is improved. Specifically, the first connecting rod 72 and the second connecting rod 71 further help to increase the folding speed to make the folding and unfolding process of the self-balancing scooter be relatively free and convenient.

The handle 3 is disposed at the first hinge connection location. When the self-balancing scooter is in the riding state, the handle 3 passes out the first holder 1 and/or the second holder 2 and is partially exposed. Thus, the handle 3 may separate the first holder 1 from the second holder 2 and enable the user to easily carry the self-balancing scooter.

A groove 18 is formed between the first holder 1 and the second holder 2 for receiving the handle 3, and thus the first holder 1 and the second holder 2 are not interfered by the handle 3 when the self-balancing scooter is in the riding state.

Figure 1:
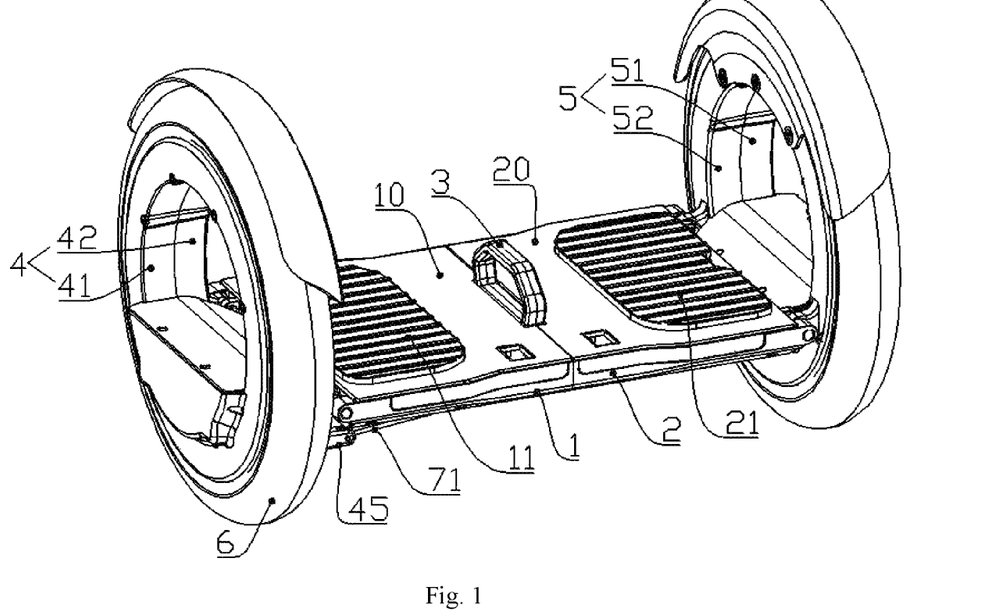
FIG. 1 is a first schematic structural view of a self-balancing scooter of the present disclosure that is in a riding state.
Figure 2:
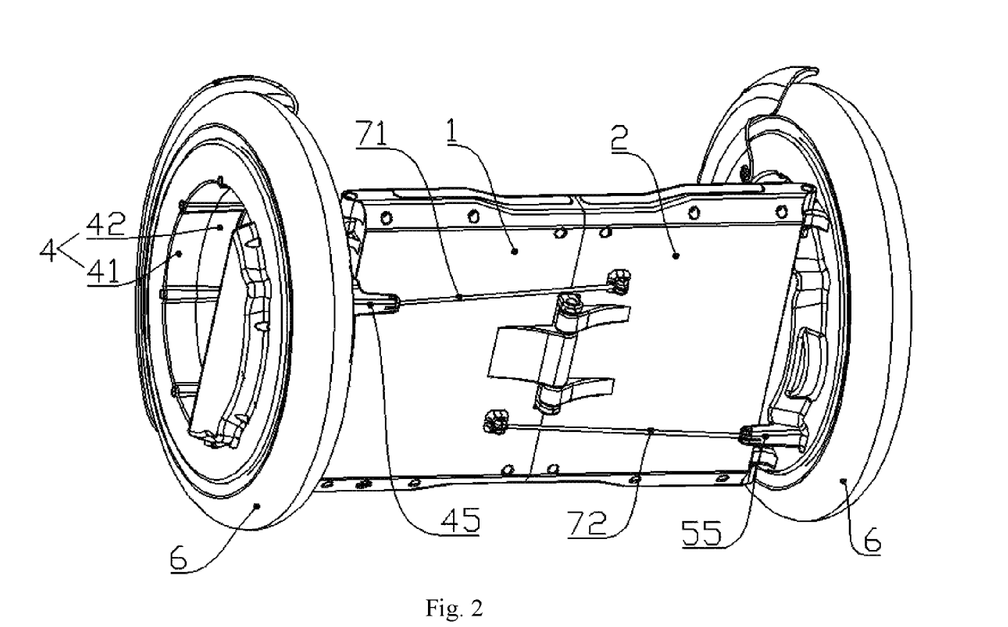
FIG. 2 is a second schematic structural view of the self-balancing scooter of the present disclosure that is in the riding state.
Figure 3:
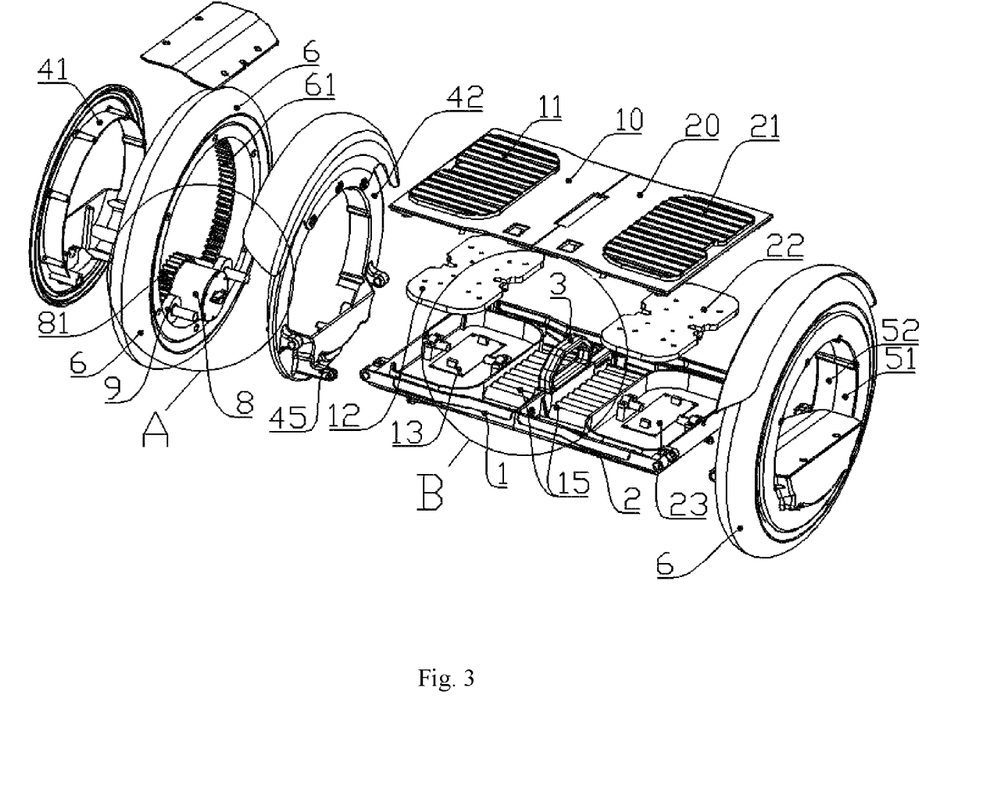
FIG. 3 is an explosive view of the self-balancing scooter of the present disclosure.
Figure 4:
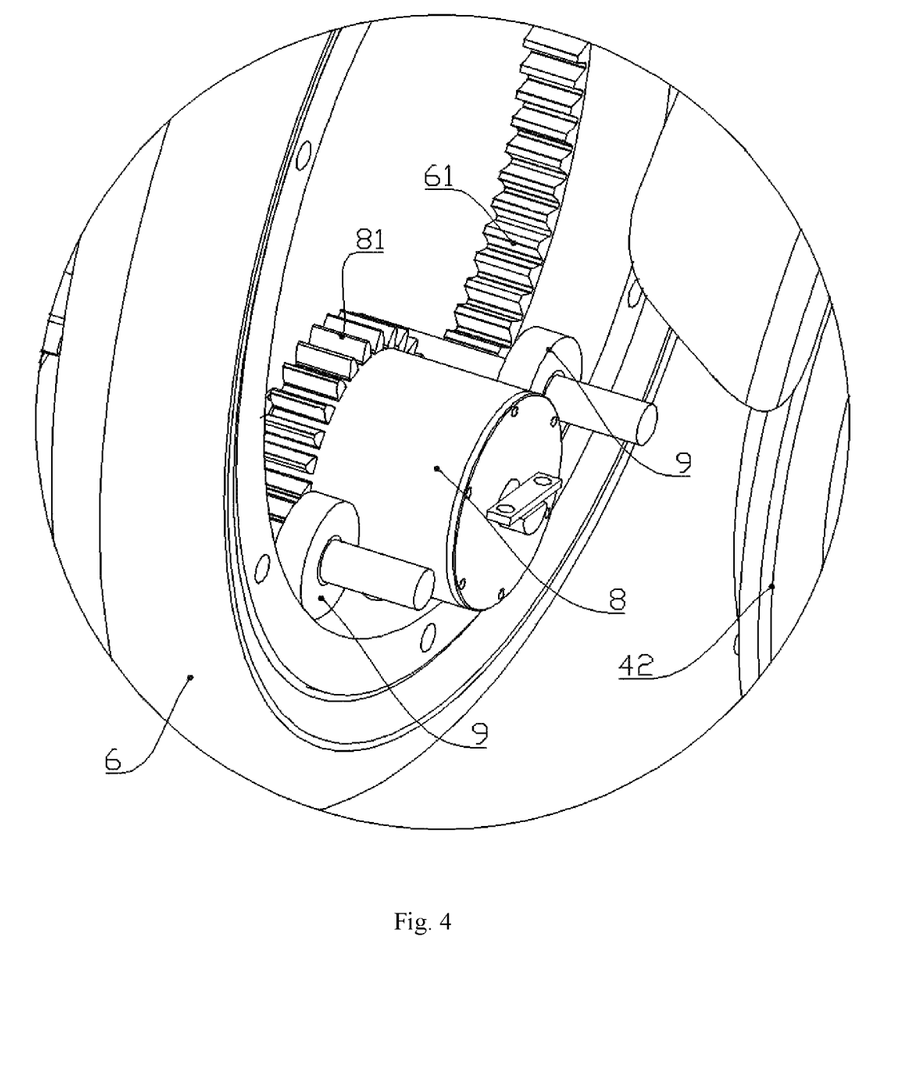
FIG. 4 is an enlarged view of part A of FIG. 3.
Figure 5:
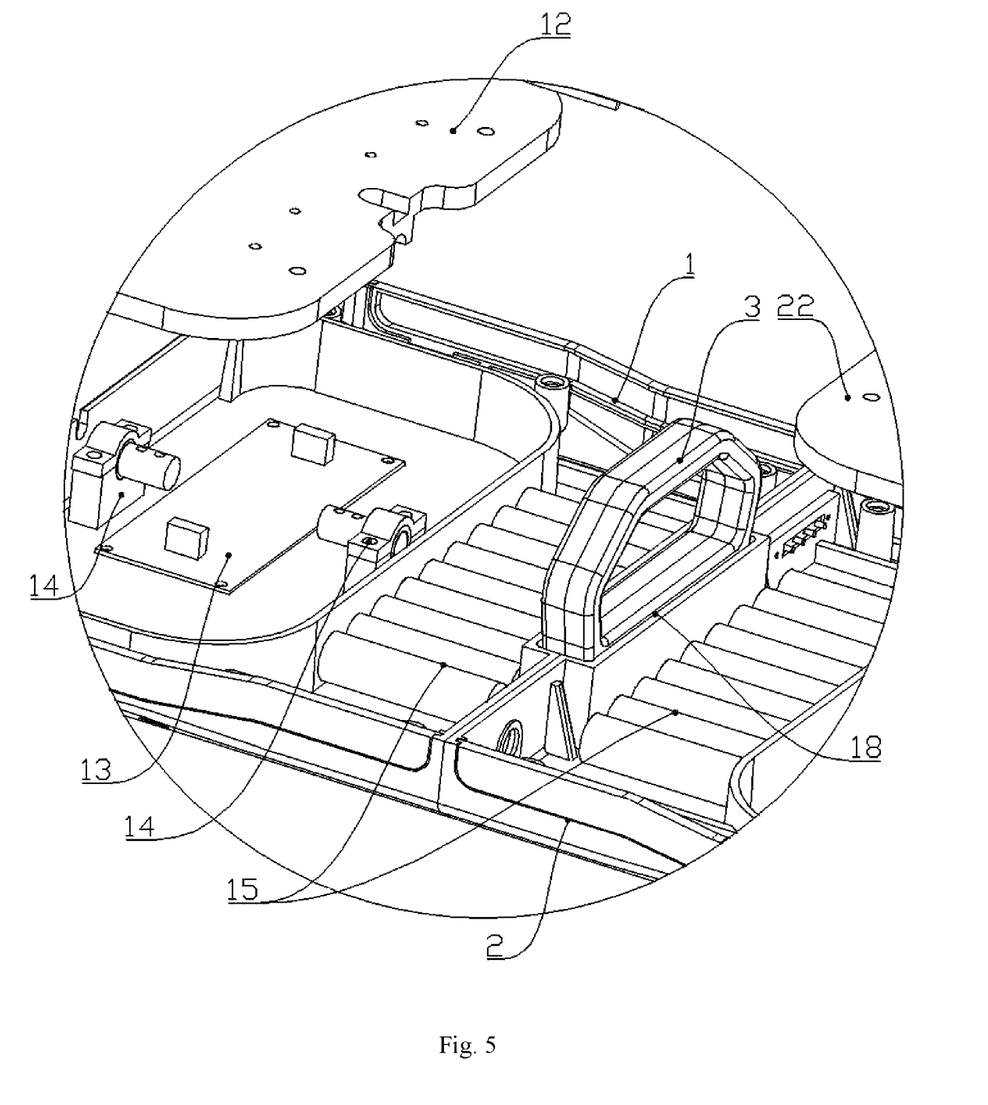
FIG. 5 is an enlarged view of part B of FIG. 3.
Figure 6:
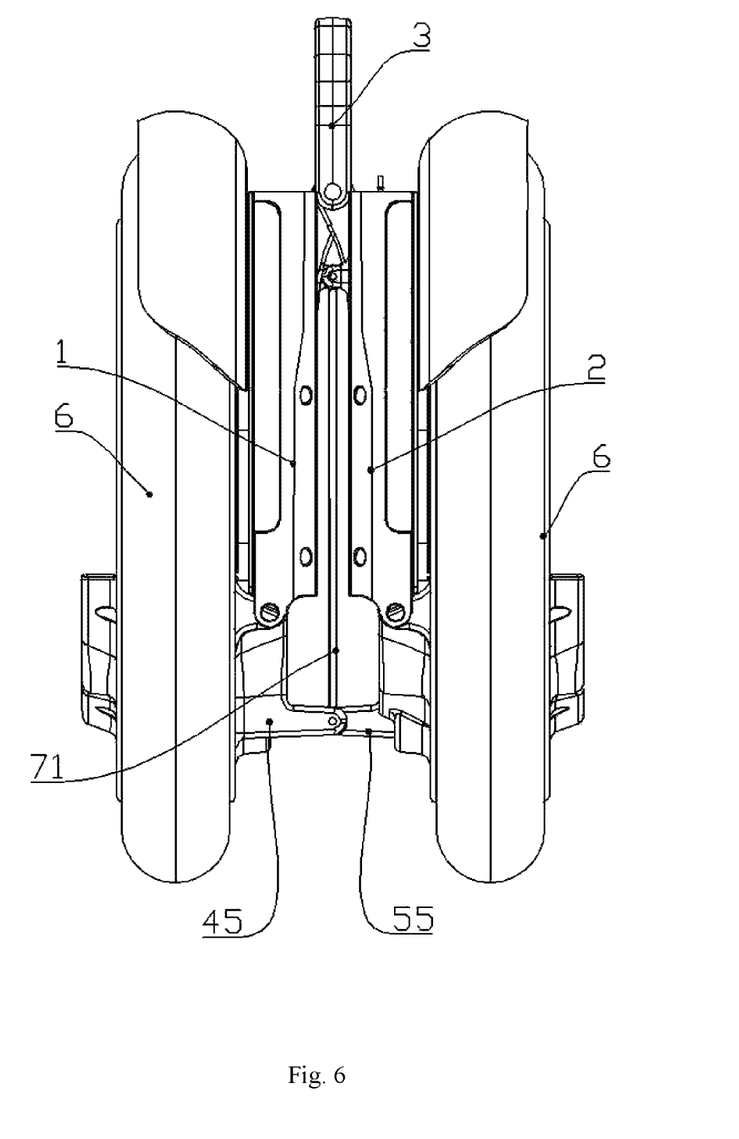
FIG. 6 is a first schematic structural view of the self-balancing scooter of the present disclosure that is in a folded state.
Figure 7:
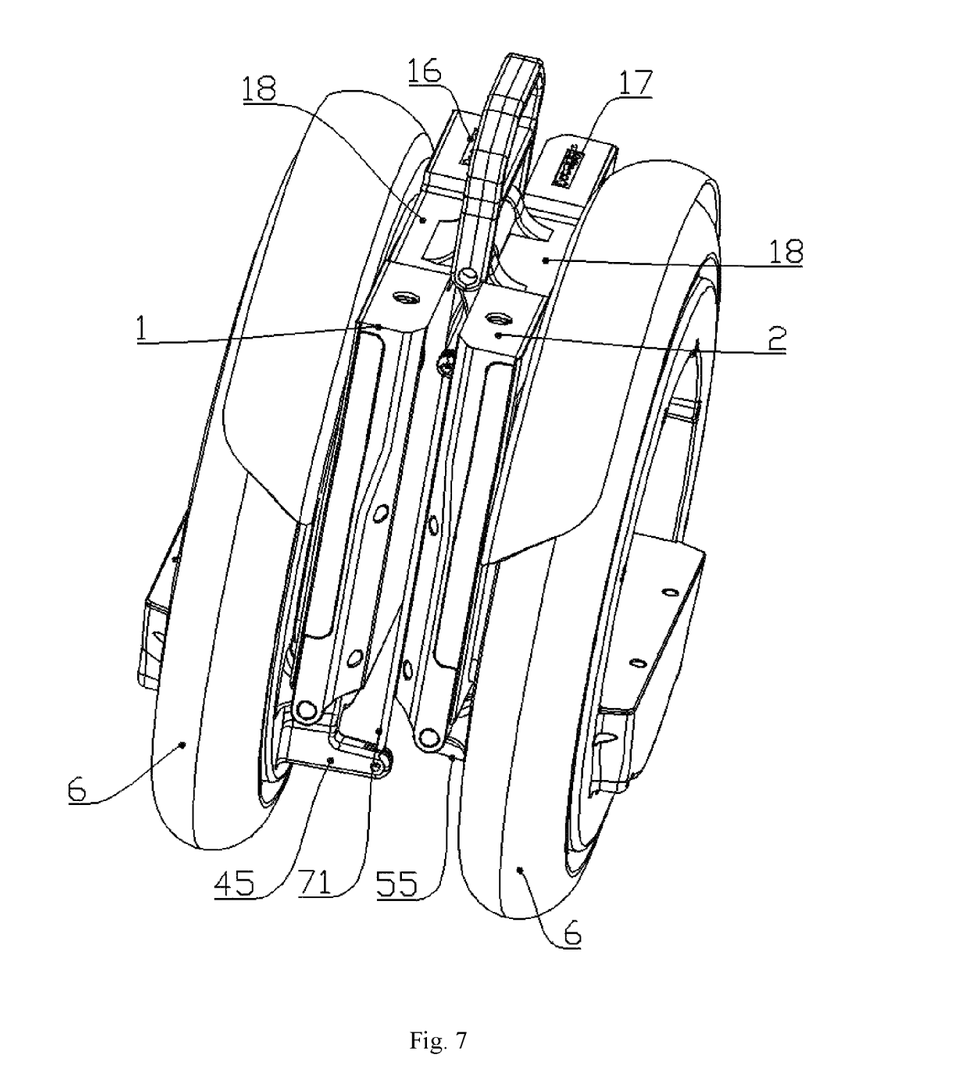
FIG. 7 is a second schematic structural view of the self-balancing scooter of the present disclosure that is in the folded state.

Referring to FIG. 4, the driving device includes a drive motor 8, an inner side of the wheel 6 is configured with an internal gear 61, the drive motor 8 is configured with an output gear 81, and the output gear 81 is meshed with the internal gear 61. As an alternative to above-mentioned structural arrangement, an output end of the drive motor 8 is configured with a reduction gearbox (not shown), an outer side of the reduction gearbox is configured with the output gear 81, and the output gear 81 is meshed with the internal gear 61. In the embodiment, the first structural arrangement is used, the structure is simple, and the cost and the weight of the product may be reduced.

The first wheel frame 4 includes a first half frame 41 and a second half frame 42, the first half frame 41 and the second half frame 42 are fixed to each other, and the wheel 6 is limited between the first half frame 41 and the second half frame 42. The first half frame 41 and the second half frame 42 are hollowed, a plurality of locating bearings 9 are fixed between the first half frame 41 and the second half frame 42, and an outer edge of the locating bearing 9 abuts against an inner surface of the wheel 6 and supports the wheel 6, thereby ensuring the wheel 6 to effectively rotate relative to the wheel frame 4. The second wheel frame 5 includes a first half frame 51 and a second half frame 52, the first half frame 51 and the second half frame 52 are fixed to each other, and the wheel 6 is limited between the first half frame 51 and the second half frame 52. The first half frame 51 and the second half frame 52 are hollowed, the plurality of locating bearings 9 are fixed between the first half frame 51 and the second half frame 52, and the outer edge of the locating bearing 9 abuts against the inner surface of the wheel 6 and supports the wheel 6, thereby ensuring the wheel to effectively rotate.

Compared with the prior art, the self-balancing scooter of the present disclosure has the following advantages:

Firstly, the first holder and the second holder are only connected in the hinged manner. The hinged components are the all components which are shared and disposed between the first holder and the second holder. Thus, the components of the first half part and the components of the second half part of the scooter are independent and interrelated, which is different from the traditional installation and connection method of the self-balancing scooter. The connection components are reduced, and the weight of the self-balancing scooter is decreased. The user enables the driving device in the first wheel frame to drive the wheel in the first wheel frame to move through driving the first foot pedal to rotate forwards or backwards, similarly the user enables the driving device in the second wheel frame to drive the wheel in the second wheel frame to move through driving the second foot pedal to rotate forwards or backwards. Thus, the user may control the self-balancing scooter through controlling the first foot pedal and the second foot pedal, and the scooter body comprising the first and second holders does not need to tilt too much. Thus, a user with poor balance capability may also use the self-balancing scooter of the present disclosure.

Secondly, the first wheel frame is hinged to the first holder, the first holder is hinged to the second holder, the second wheel frame is hinged to the second holder, and the self-balancing scooter may be folded by lifting the handle disposed between the first holder and the second holder. When the self-balancing scooter is in the folded state, the space occupied by the self-balancing scooter is greatly decreased, and the user may easily carry the self-balancing scooter through the handle. When the self-balancing scooter is in the riding state, the first wheel frame abuts against the first holder, the first holder abuts against the second holder, and the second wheel frame abuts against the second holder. Therefore, the structural stability of the self-balancing scooter in the riding state is ensured.

Thirdly, the first connecting rod is disposed between the first holder and the second wheel frame, and the second connecting rod is disposed between the second holder and the first wheel frame. When the self-balancing scooter is in the riding state, the first connecting rod and the second connecting rod are under the first holder and the second holder; when the self-balancing scooter is in the folded state, the first connecting rod and the second connecting rod are in the gap between the first holder and the second holder. The cross-supported manner of the first connecting rod and the second connecting rod improves the structural stability of the self-balancing scooter in the riding state, and plays the leading role in the folding or unfolding process of the self-balancing scooter to make the self-balancing scooter be easily folded or unfolded.

Fourthly, the first half part and the second half part of the self-balancing scooter are only connected in the hinged manner, and the first half part and the second half part respectively have the ability to work independently, and may be combined to form the whole entity. The first holder and the second holder are respectively provided with one power supply. The power supply in the first holder supplies power to the driving device in the first wheel frame and the first induction device, and the power supply in the second holder supplies power to the driving device in the second wheel frame and the second induction device. The first induction device and the second induction device are the angular sensor, and the angular sensor is configured to sense the movements or movement trends of the first foot pedal and the second foot pedal. The angular sensor is configured to preferably sense the rotation motion, thereby ensuring the accuracy of the first and second signals sent to the driving device, and improving the stability of the driving device.

The present disclosure inevitably refers to the circuit control, but the circuit control is not the protected content of the present disclosure. A person skilled in the art may easily manufacture the circuit control panel suitable for the structure of the self-balancing scooter of the present disclosure according to the above-mentioned structure of the self-balancing scooter. In addition, the angular sensor is the common electrical component, the circuit technologies of controlling the drive motor to rotate by the rotation angle and the wiring of the circuit are simple, and so that the labels about the circuit are shown in the figures.

The above embodiments are only the preferred embodiments of the present disclosure, and do not limit the scope of the present disclosure. A person skilled in the art may make various other corresponding changes and deformations based on the described technical solutions and concepts. And all such changes and deformations shall also fall within the scope of the present disclosure.

What is claimed is:

1. A self-balancing scooter, comprising:
a first holder configured with a first foot pedal and a first cover;
a second holder hinged to the first holder, and configured with a second foot pedal and a second cover;
a first wheel frame hinged to the first holder;
a second wheel frame hinged to the second holder;
two wheels rotationally disposed in the first wheel frame and the second wheel frame, respectively;
a power supply disposed in the second holder and/or the first holder; and
a handle;
wherein a first end of the first holder is hinged to a first end of the second holder, a second end of the first holder is hinged to the first wheel frame, and a second end of the second holder is hinged to the second wheel frame; a hinge connection location of the first holder and the second holder is named as a first hinge connection location, a hinge connection location of the first holder and the first wheel frame is named as a second hinge connection location, and a hinge connection location of the second holder and the second wheel frame is named as a third hinge connection location; the first cover is mounted above the first foot pedal, and the second cover is mounted above the second foot pedal; the first foot pedal is rotatable relative to the first holder, and the second foot pedal is rotatable relative to the second holder;
the handle is disposed at the first hinge connection location; when the handle is lifted up, the first holder and the second holder are folded toward each other, the first wheel frame rotates relative to the second hinge connection location until the first wheel frame abuts the first cover, and the second wheel frame rotates relative to the third hinge connection location until the second wheel frame abuts the second cover; when the handle is released, the first holder and the second holder are in an unfolded state, the first wheel frame returns to be disposed at the second end of the first holder and the second wheel frame returns to be disposed at the second end of the second holder to make the self-balancing scooter be in a riding state.

2. The self-balancing scooter of claim 1, wherein a first connecting rod is disposed between the first holder and the second wheel frame, and a second connecting rod is disposed between the second holder and the first wheel frame; when the self-balancing scooter is in the riding state, the first connecting rod and the second connecting rod are under the first holder and the second holder; when the self-balancing scooter is in the folded state, the first connecting rod and the second connecting rod are in a gap between the first holder and the second holder.

3. The self-balancing scooter of claim 2, wherein a first end of the first connecting rod is hinged to a lower surface of the first holder, a second hinged seat extends laterally from the second wheel frame, and a second end of the first connecting rod is hinged to the second hinged seat; a first end of the second connecting rod is hinged to a lower surface of the second holder, a first hinged seat extends laterally from the first wheel frame, and a second end of the second connecting rod is hinged to the first hinged seat; the first hinged seat and the second hinged seat are located above inner surfaces of the first wheel frame and the second wheel frame.

4. The self-balancing scooter of claim 1, wherein the first hinge connection location is located at a lower end of a contact position of the first holder and the second holder; when the self-balancing scooter is in the riding state, the first end of the first holder and the first end of the second holder abut against each other.

5. The self-balancing scooter of claim 1, wherein the second hinge connection location is located at the second end of the first holder, and the third hinge connection location is located at the second end of the second holder; when the self-balancing scooter is in the riding state, a first end of the first wheel frame and the second end of the first holder abut against each other, and a first end of the second wheel frame and the second end of the second holder abut against each other.

6. The self-balancing scooter of claim 1, wherein the second hinge connection location and the third hinge connection location are respectively located above gravity centre of the first wheel frame and the second wheel frame such that when the handle is lifted up, the first wheel frame rotates relative to the second hinge connection location under an influence of gravity until the first wheel frame abuts the first cover, and the second wheel frame rotates relative to the third hinge connection location under the influence of gravity until the second wheel frame abuts the second cover.

7. The self-balancing scooter of claim 1, wherein when the self-balancing scooter is in the riding state, the handle passes out the first holder and/or the second holder, and is partially exposed.

8. The self-balancing scooter of claim 7, wherein a groove is formed between the first holder and the second holder for receiving the handle.

9. The self-balancing scooter of claim 1, wherein the first holder and the second holder are respectively provided with one power supply; the power supply in the first holder supplies power to the driving device in the first wheel frame and the first induction device, and the power supply in the second holder supplies power to the driving device in the second wheel frame and the second induction device.

10. The self-balancing scooter of claim 1, wherein the self-balancing scooter further comprises two driving devices respectively disposed in the first wheel frame and the second wheel frame and configured to drive the wheels to rotate, a first induction device mounted between the first foot pedal and the first holder, and a second induction device mounted between the second foot pedal and the second holder; the first induction device is configured to induce movement or movement trend of the first foot pedal and sends a first signal to the driving device in the first wheel frame, and the second induction device is configured to induce movement or movement trend of the second foot pedal and sends a second signal to the driving device in the second wheel frame; the driving device in the first wheel frame starts to work after receiving the first signal, and the driving device in the second wheel frame starts to work after receiving the second signal.

11. The self-balancing scooter of claim 10, wherein the driving device comprises a drive motor, an inner side of the wheel is configured with an internal gear, the drive motor is configured with an output gear, and the output gear is meshed with the internal gear.

12. The self-balancing scooter of claim 10, wherein the driving device comprises a drive motor, an inner side of the wheel is configured with an internal gear, an output end of the drive motor is configured with a reduction gearbox, an outer side of the reduction gearbox is configured with an output gear, and the output gear is meshed with the internal gear.

13. The self-balancing scooter of claim 1, wherein the first wheel frame comprises a first half frame and a second half frame, the first half frame and the second half frame are fixed to each other, and the wheel is limited between the first half frame and the second half frame; the first half frame and the second half frame are hollowed, a plurality of locating bearings are fixed between the first half frame and the second half frame, and an outer edge of the locating bearing abuts against an inner surface of the wheel and supports the wheel; the second wheel frame comprises a first half frame and a second half frame, the first half frame and the second half frame are fixed to each other, and the wheel is limited between the first half frame and the second half frame; the first half frame and the second half frame are hollowed, the plurality of locating bearings are fixed between the first half frame and the second half frame, and the outer edge of the locating bearing abuts against the inner surface of the wheel and supports the wheel.

\* \* \* \* \*